June 3, 1930.   C. R. SHORT   1,761,939
ELECTRIC BOOSTER BRAKE
Filed Jan. 30, 1928
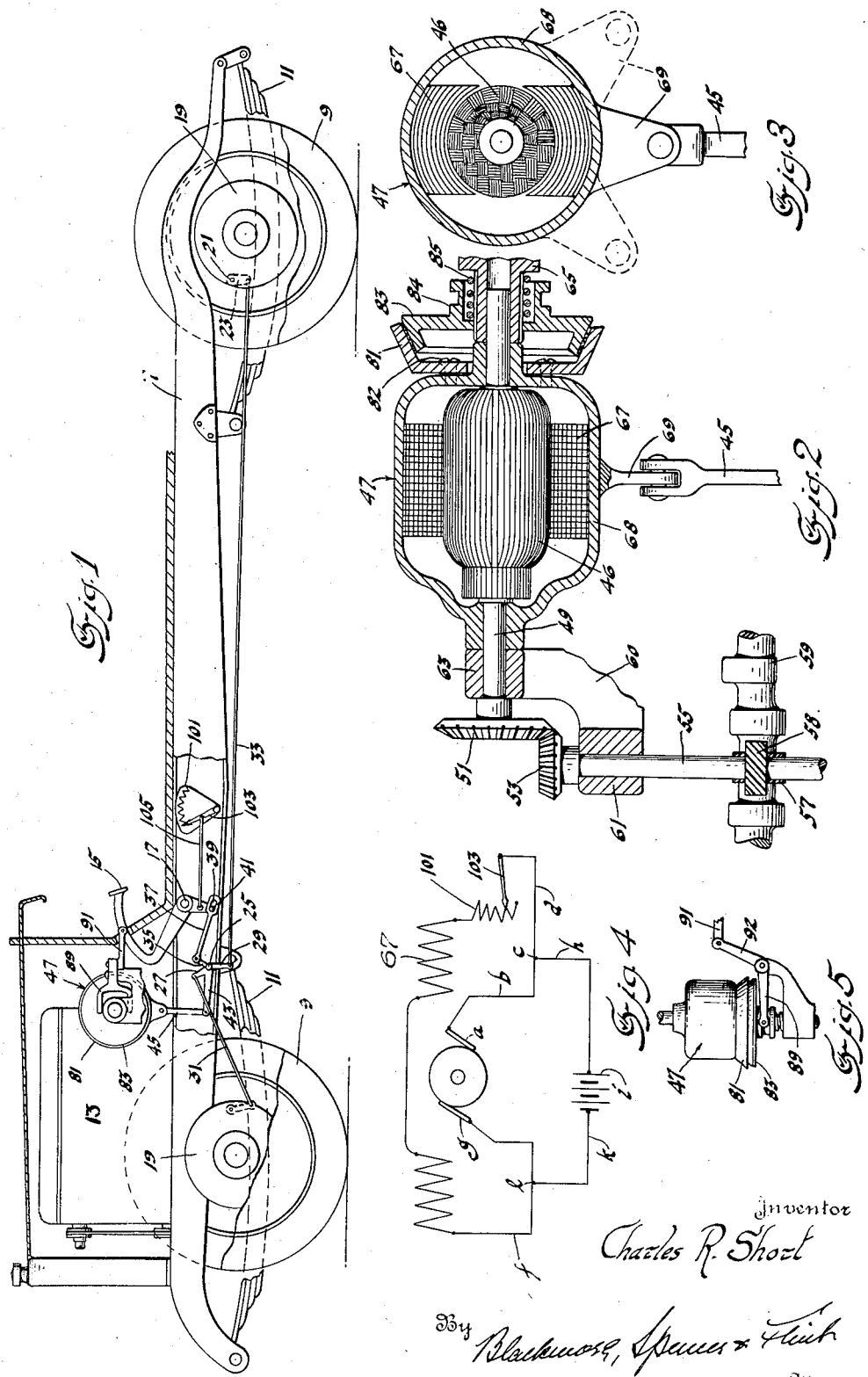
Inventor
Charles R. Short
By Blackmore, Spencer & Flint
Attorneys Patented June 3, 1930

1,761,939

UNITED STATES PATENT OFFICE

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE

ELECTRIC BOOSTER BRAKE

Application filed January 30, 1928. Serial No. 250,476.

This application relates to brakes. More particularly the invention makes use of a source of power associated with a motor of a motor vehicle to apply the mechanical brakes independently of or supplemental to the manual effort exerted by the operator.

An object of the invention is to arrange a power operated brake controlled by the operator, and to so arrange the mechanism that the brakes may be applied by manual effort alone in any emergency. A further object is to utilize an electric generator which normally serves to charge the battery of the motor vehicle, to release the power for brake operation. Other objects and advantages will be understood from a reading of the following description with an examination of the accompanying drawing.

In the drawing:

Figure 1 represents a motor vehicle chassis in side elevation, partly in section.

Figure 2 is a sectional view transversely of the vehicle through a generator driven by the motor of the vehicle.

Figure 3 is a sectional view of the generator at right angles to Figure 2.

Figure 4 is a diagram representing the wiring.

Figure 5 is a top plan view of a generator and its clutch.

Referring by reference characters to the drawing, numeral 7 represents one of the frame bars of the chassis. The wheels are designated by reference character 9 and 11 are the springs supporting the chassis frame from the wheels. Numeral 13 represents the usual motor and 15 is a brake pedal pivoted at any convenient point on the chassis as at 17. On each wheel is a drum 19 frictionally engaged by suitable shoes or bands, not shown, and preferably located within the drum. The actuating means for operating the shoes or band against the drum may be of any preferred kind, for example, a cam. This cam or other actuating means may be carried by a shaft 21 extending through the axle backing plate and having secured thereto an operating arm 23. At a convenient position near the pedal is rotatably mounted a rock shaft 25. This rock shaft has arms 27 and 29. Links 31 and 33 connect these arms 27 and 29 with the front and rear brakes respectively. It will be seen that rotation of rock shaft 25 in a clockwise direction will apply the brakes, both front and rear. Shaft 25 has another arm 35. Between this arm 35 and an extension of pedal 15 below its pivot 17 is a link 37. This link is provided with a lost motion connection at the pedal in the form of a slot 39 engaged by a pin 41 carried by the pedal. In actuating the brakes by manual effort when the pedal is depressed it first takes up the lost motion at 39 and thereafter pulls through link 37 and arm 35 and rocks the rock shaft 25 in a clockwise direction.

Shaft 25 has still another arm 43 to the end of which is pivoted a link 45. This link 45 extends substantially vertically and is arranged to be pulled upward by a power means, this upward movement serving to rotate shaft 25 through the aid of link 45. This power means takes the form of an electric generator of special form which may be used as a generator for charging the battery of the car in the usual way.

At 47 such a generator is illustrated. It comprises an armature 46 carried by a shaft 49. A bevel gear member 51 is secured to shaft 49 at one end and is driven by a cooperating bevel gear 53 carried by a shaft 55. Shaft 55 may be provided with a spiral gear 58 engaged with a cooperating gear 57 mounted on the motor cam shaft 59. This system of shafts and gears is but one way in which the generator armature may be driven, and is intended to be illustrative only. At 60 is shown a bracket suitably mounted on the chassis, the bracket having bearings at 61 and 63 for rotatably supporting the shafts 55 and 49 respectively. At 65 is a second bearing bracket for the armature shaft 49. Between bearings 63 and 65 is a field member 68 carrying as usual the field coils 67. Differing from the conventional construction the field member 68 is not mounted rigidly but is rotatably mounted upon the armature shaft 49. Rigid with the field member is a depending arm 69 which is pivoted to the upper end of the before mentioned link 45. It will thus be seen that the rotation of the field member in either direction (see Figure 3) will pull upon the link 45 and through the instrumentality of arm 43 rotate shaft 25 in clockwise direction and apply the several brakes.

It is preferred to utilize as the power means a generator which shall normally function to charge the battery of the car, and it may be assumed that the generator 47 is intended to so operate. It will be understood that in performing its usual function the field member and its coil must be held stationary, and must also to exercise its brake applying action be releasable and rotatable. To that end there is associated with the rotatable field member a brake which holds it from rotation under normal driving conditions but which is releasable when it is desired to utilize the power means as a brake applying instrumentality. To that end the field member carries a brake element 81 secured thereto by any suitable fastening means as at 82. Co-operating with the brake member 81 is a second brake member 83 which is slidably but non-rotatably mounted on the bearing bracket 65. A spring 85 is in abutment at one end with a part of the bearing bracket 65 and at its other end with a slidable brake member 83. This spring normally functions to hold the brake members 81 and 83 in engagement and, inasmuch as 83 is non-rotatable, the field member is held from rotation. When so held the generator 47 is obviously functioning in its usual way and serves the purpose of charging the battery of the car. To release the brake and free the field member for rotary movement, which movement is to cause rotation of the shaft 25 and to apply the brakes, the slidable brake member 83 is formed with a collar 84 engaged by a fork 89 on a bell crank lever. To the pedal is connected a link 91 operable when the pedal is depressed to slide the slidable clutch member 83 away from clutch member 81 and against the tension of the spring 85 to thus release the field member for free rotatry movement. This action of operating the clutch member is effected by connecting link 91 to an arm 92 of the bell crank, the other arm of which is the before mentioned fork 89. When the pedal is depressed it pushes through link 91, rotates the bell crank, and releases the clutch.

It will be understood that the rotating armature produces a magnetic drag tending to rotate the field member, which rotation is normally prevented by the brake. When the brake is released this magnetic drag permits the field member to rotate and the brake to be applied. To aid the field member in applying the brake it is proposed to progressively energize the field by cutting out resistance, this cutting out of resistance being accomplished by the depression of the brake pedal itself. For the accomplishment of this purpose a resistance member 101 is mounted at any convenient position near the brake pedal. Operable over the resistance member 101 is an arm 103. As the pedal is depressed it swings arm 103 by means of a link 105 connected to arm 103 and to the pedal. This movement of arm 103, as will be seen from Figure 1 and also from Figure 4, progressively cuts out resistance in resistance member 101. As the resistance is cut out the field is progressively energized, the magnetic drag is increased and the brake action is more effective. It will be seen that in whichever direction the armature is rotating the linkage between the field member and the brake is such that the magnetic drag always rotates the rock shaft 25 in brake applying direction.

Referring now to Figure 4, this figure represents the circuit employed. From brush $a$ of the generator the current passes through wire $b$ to a point $c$ where it may divide. One branch $d$ is connected to the arm 103 operable upon resistance member 101 as already described. The resistance member 101 is connected as shown in Figure 4 to the field coils 67 and from the field coil 67 the wire $f$ leads to the other brush $g$. The second branch from point $c$ is represented by a wire $h$ leading to the battery $i$. From the battery wire $k$ leads to a point $l$ on the return wire $f$. When the pedal is in released position the resistance is cut in as shown in Figure 1 and Figure 4. Under these circumstances also the brake is holding the field member from rotation. When the pedal is depressed the brake is released, and the resistance is progressively cut out and the field progressively energized. There results an increasing magnetic drag which rotates the field member and through the instrumentality of parts 45 and 43 rotates shaft 25 and applies the brakes. If the motor speed becomes quite low and the armature consequently rotates quite slowly it may be that the generator will be incapable of bringing the vehicle to a full stop. Under these circumstances the manual effort applied to the pedal takes up the lost motion 41 and exerts sufficient force upon the brakes to stop the car. In the event of any failure of the servo-mechanism it will be understood that the lost motion connection at 39, 41 will be readily taken up and the brakes will be applied as in the usual manner where no servo-mechanism is present.

It will be understood that if desired any preferred form of reduction gearing may be used between the rotating field member and the brake mechanism to give any desired torque. It is preferred, however, to omit such gear reduction unless it shall be found necessary and for that reason no such gear reduction is illustrated.

I claim:

1. In a vehicle, brake means, a generator comprising an armature and a field, both rotatably mounted, means associated with one of said generator parts and connected to said brakes to apply the same as the result of the magnetic drag of one of said parts upon the other, means to hold said brake applying part from rotation and manually operable means to release said holding means.

2. In a vehicle, brake means, a generator comprising an armature and a field, both rotatably mounted, means associated with one of said generator parts and connected to said brakes to apply the same as the result of the magnetic drag of one of said parts upon the other, together with means to normally hold said last named generator part from rotation.

3. In a vehicle, a frame, an engine, wheels to support said frame, brake means to check rotation of said wheels, an electric generator driven by said engine, said generator comprising a driven armature and a rotatably mounted field, means connecting said field and said brake means whereby the drag of said armature upon the field may rotate the latter and apply the brake means.

4. The invention defined by claim 3, together with releasable means normally holding said field from rotation.

5. The invention defined by claim 3 together with releasable means normally holding said field from rotation, a manually operable member and mechanism connecting said manually operable member and said releasable means.

6. The invention defined by claim 3 together with releasable means normally holding said field from rotation, a manually operable member, mechanism connecting said manually operable member and said releasable means, a resistance member, means controlled by said manually operable member to progressively cut out resistance in said resistance member and increasingly energize the field.

7. The invention defined by claim 3 together with releasable means normally holding said field from rotation, a manually operable member, mechanism connecting said manually operable member and said releasable means, a resistance member, means controlled by said manually operable member to progressively cut out resistance in said resistance member and increasingly energize the field, said manually operable member having a lost motion connection with said brake means for independent direct mechanical brake application.

8. In a motor vehicle, a motor, a battery, a generator driven by said motor and connected to said battery to charge the same, said generator having a rotatable field, means to normally hold the field from rotation, a pedal, means actuated by the pedal to release said holding means and permit the field to rotate, connections between said field and brakes whereby the brakes are power applied.

9. The invention defined by claim 8, together with resistance means, means associated with said pedal to progressively cut out said resistance and increasingly energize said field to increase the magnetic drag and apply the brakes.

10. The invention defined by claim 8, together with resistance means, means associated with said pedal to progressively cut out said resistance and increasingly energize said field to increase the magnetic drag and apply the brakes, said pedal having additionally a lost motion connection with said brakes for direct mechanical brake application.

In testimony whereof I affix my signature.

CHARLES R. SHORT.